(12) United States Patent
Stoerig

(10) Patent No.: US 7,281,886 B2
(45) Date of Patent: Oct. 16, 2007

(54) SUCTION DEVICE

(75) Inventor: Thorsten Stoerig, Aurich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/939,058

(22) Filed: Sep. 10, 2004

(65) Prior Publication Data

US 2005/0089380 A1 Apr. 28, 2005

(30) Foreign Application Priority Data

Sep. 12, 2003 (DE) ............... 103 42 507

(51) Int. Cl.
*B23B 47/34* (2006.01)
*B28D 7/02* (2006.01)
(52) U.S. Cl. .................. 408/67; 408/110; 175/213
(58) Field of Classification Search .................. 408/67, 408/97, 110, 112; 409/137; 175/213
See application file for complete search history.

(56) References Cited

U.S. PATENT DOCUMENTS

| | | | |
|---|---|---|---|
| 1,990,991 A * | 2/1935 | Heubach | 409/137 |
| 2,144,586 A * | 1/1939 | Kelley | 175/71 |
| 2,339,324 A * | 1/1944 | Fischer | 408/56 |
| 2,634,952 A * | 4/1953 | Brinkley | 175/209 |
| 2,771,271 A * | 11/1956 | Lawson, Sr. | 175/209 |
| 3,368,633 A * | 2/1968 | Moates | 173/60 |
| 3,850,254 A * | 11/1974 | Hirdes | 173/75 |
| 4,064,952 A * | 12/1977 | Lechner | 175/209 |
| 4,097,176 A * | 6/1978 | Wanner et al. | 408/56 |
| 4,250,971 A * | 2/1981 | Reibetanz et al. | 175/209 |
| 5,090,499 A * | 2/1992 | Cuneo | 175/209 |
| 5,113,951 A * | 5/1992 | Houben et al. | 173/75 |
| 5,129,467 A * | 7/1992 | Watanabe et al. | 173/75 |
| 5,467,835 A * | 11/1995 | Obermeier et al. | 175/209 |
| 5,584,620 A * | 12/1996 | Blickhan et al. | 409/137 |
| 5,688,082 A * | 11/1997 | Richardson | 408/67 |
| 5,765,654 A * | 6/1998 | Burger | 175/211 |
| 5,882,155 A * | 3/1999 | Testa, Jr. | 409/132 |
| 5,919,010 A * | 7/1999 | Fonseca | 408/67 |
| 6,024,144 A * | 2/2000 | Qian | 144/252.1 |
| 6,053,674 A * | 4/2000 | Thompson | 408/67 |
| 6,199,644 B1 * | 3/2001 | Thanner et al. | 175/207 |
| 6,200,075 B1 * | 3/2001 | Gaskin et al. | 408/67 |
| 6,237,657 B1 * | 5/2001 | Qian | 144/252.1 |
| RE37,247 E * | 6/2001 | Blickhan et al. | 409/137 |
| 6,443,676 B1 * | 9/2002 | Kopras | 409/182 |
| 6,481,474 B1 * | 11/2002 | Liao et al. | 144/252.1 |
| 6,615,930 B2 * | 9/2003 | Bongers-Ambrosius et al. | 173/198 |
| 6,851,898 B2 * | 2/2005 | Ege et al. | 408/67 |
| 6,887,146 B2 * | 5/2005 | Staas et al. | 454/66 |
| 6,951,439 B2 * | 10/2005 | Arich | 408/67 |
| 7,017,680 B2 * | 3/2006 | Arich et al. | 173/198 |
| 2001/0052429 A1* | 12/2001 | Frenzel et al. | 175/210 |
| 2002/0154960 A1* | 10/2002 | Lin | 408/67 |
| 2005/0281627 A1* | 12/2005 | Britz | 408/67 |
| 2006/0153650 A1* | 7/2006 | Simm et al. | 408/58 |

FOREIGN PATENT DOCUMENTS

| | | |
|---|---|---|
| DE | 0567182 | 12/1932 |
| DE | 2925908 | 2/1981 |
| DE | 9609060 | 9/1996 |
| DE | 0104782 | 8/2002 |
| JP | 09225718 A * | 9/1997 |

* cited by examiner

*Primary Examiner*—Monica Carter
*Assistant Examiner*—Michael W. Talbot
(74) *Attorney, Agent, or Firm*—Abelman, Frayne & Schwab

(57) ABSTRACT

A suction device that is used with a power drilling tool for aspirating material removable during operation of the drilling tool, and which includes a suction head (20) displaceable relative to the drilling tool (2) in a direction opposite a drilling direction (B) of the drilling tool (2), and an aeration device (22) fixedly connected by a suction conduit with the suction head (20) for joint displacement therewith.

6 Claims, 3 Drawing Sheets

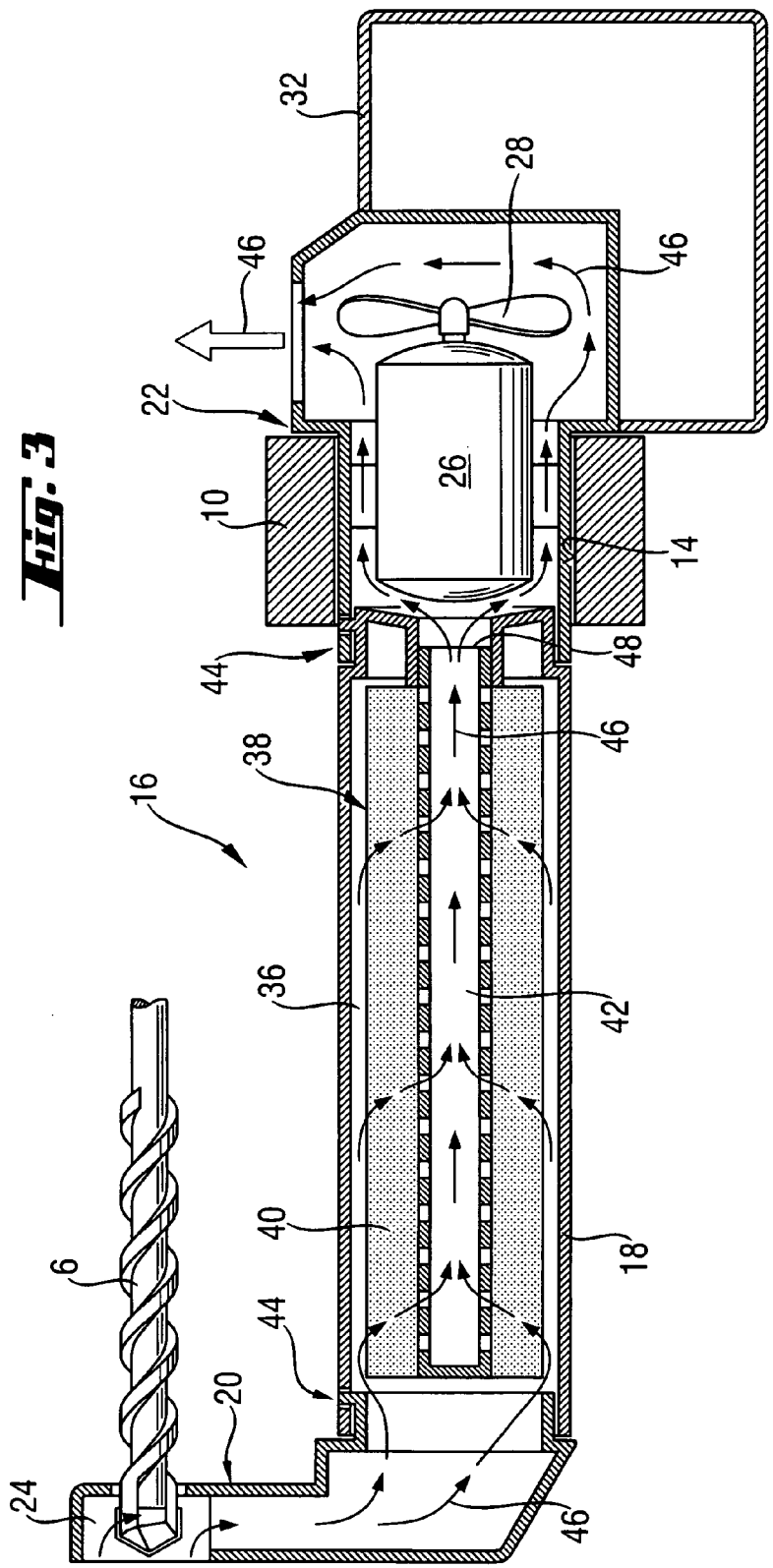

SUCTION DEVICE

BACKGROUND OF THE INVENTION

1. Field of the Invention

The present invention relates to a suction device which is used with a power drilling tool for aspirating material removable during operation of the drilling tool such as drilling dust and drillings and which includes a suction head having a suction opening and displaceable relative to the drilling tool in a direction opposite a drilling direction of the drilling tool, an aeration device for producing a suction air current, and a suction conduit for connecting the suction head with the aeration device.

2. Description of the Prior Art

The advantage of the suction devices of the type described above consists in that a suction nozzle, which forms part of the suction head and is displaceably supported on the drilling tool, is displaced during the drilling process, in the direction opposite the drilling direction by the same amount the drill penetrates into the drilled surface. As a result of the displacement of the suction nozzle, it is always retained at the drill opening, which permits the removal of a relatively large amount of the drilling dust and drillings. The displacement of the suction nozzle relative to the drilling tool is effected by placing the nozzle against the drilling surface, with the nozzle being displaced by the counter-pressure of the surface which is applied to the suction nozzle as the drill advances.

U.S. Pat. No. 5,090,499 discloses a suction device releaseably connectable with a drilling tool. This suction device has an auxiliary handle on which all of the components of the suction device are supported and which can be clamped on the cylindrical receiving surface of the tool to which a conventional auxiliary handle is usually clamped. In order to be able to displace the suction head relative to the drilling tool in the direction opposite the drilling direction during operation of the tool, the suction head is displaceably supported by a rigid section of the suction conduit on the auxiliary handle and is connected with the aeration device by a flexible, bent section of the conduit. The suction conduit is connected at the end of the flexible section remote from the nozzle by the aeration device with a connector of a collection device which is likewise provided on the auxiliary handle.

The drawback of the known suction device is that the suction path between the suction nozzle and the collection device is relatively long because of the flexible bent section of the suction conduit. This leads to relatively high flow losses and a resulting reduction of the suction capacity. Moreover, the drawback of the flexible, bent section of the suction conduit consists in that, on the one hand, flow characteristics change during the drilling operation and, on the other hand, disturbances in the operation of the suction device can occur because of possible bending of the flexible section during operation.

Accordingly, one object of the present invention is to provide a suction device of a type described above in which the drawbacks of the known suction device are eliminated.

Another object of the invention is to provide a suction device of a type described above and having a high suction capacity.

SUMMARY OF THE INVENTION

These and other objects of the present invention, which will become apparent hereinafter, are achieved by fixedly connecting the aeration device with the suction head for joint displacement therewith in the same direction and by the same amount.

With the aeration device displacing together with the suction head in the same direction and by the same amount, the flow characteristics remain substantially constant during the drilling process. As a result, the suction device can be optimally adapted to the envisaged operation to achieve a maximal suction performance.

Advantageously, the suction conduit between the suction head and the aeration device is formed by a rigid suction pipe. "Rigid" here means that the suction pipe is essentially deformation free, i.e., is inflexible. In this way, the aeration device is retained in the same position relative to the suction head during the displacement of the suction head relative to the drilling tool.

Preferably, during the operation of the suction device, the suction head and the aeration device are supported by a common guide for displacement relative to the drilling tool, which insures a simultaneous displacement of both components relative to the drilling tool.

According to a particularly advantageous embodiment of the present invention, the guide is releaseably mounted on the drilling tool, which permits the use of the suction device with different drilling tools.

Advantageously, the aeration device is connectable with the power supply of the drilling tool, which eliminates the need for a separate power supply for the suction device. By connecting the aeration device with the power supply of the tool the device is used with, weight and costs are reduced.

Alternatively, the actuation device can have a separate, accumulator-driven motor. In this way, a completely independently operating suction device is obtained, which may be used with a very large number of different tools.

Preferably, the suction pipe has a receiving chamber for a filter element, so that the material, which is produced during drilling consisting of drilling dust and drillings, can be produced relatively close to the suction nozzle. Thereby, the suction path can be noticeably reduced, which increases the suction capacity.

It is advantageous when the receiving chamber extends over almost the entire length of the suction pipe. This permits the use of a particularly long filter element with a correspondingly high filtering action.

The novel features of the present invention, which are considered characteristic for the invention, are set forth in the appended claims. The invention itself, however, both as to its construction and its mode of operation, together with additional advantages and objects thereof, will be best understood from the following detailed description of preferred embodiment when read with reference to the accompanying drawings.

BRIEF DESCRIPTION OF THE DRAWINGS

The drawings show:

FIG. 3. a longitudinal cross-sectional view of the suction device in the position shown in FIG. 2.

DETAILED DESCRIPTION OF THE PREFERRED EMBODIMENT

Figure 1:
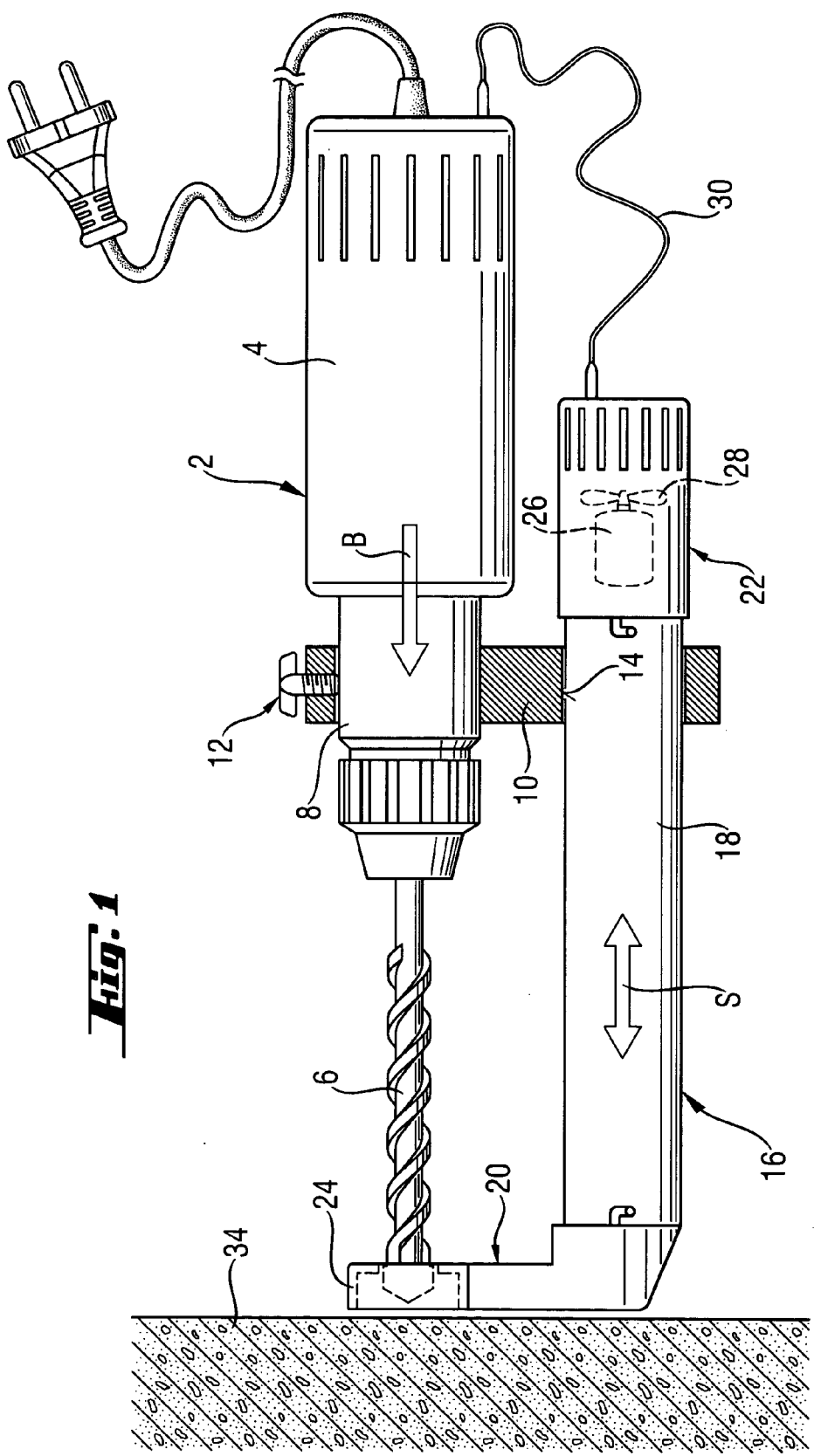
FIG. 1. a plan view of the upper surface of a drill with a suction device according to the present invention.

A drilling tool 2, which is shown in FIG. 1, includes a housing 4, a drill 6, and a cylindrical receiving region 8. Instead of an auxiliary handle, which is normally secured to the receiving region 8, a connection device 10 is releaseably secured to the cylindrical region. The attachment and release of the connection device 10 are effected with simple clamp means 12 of the connection device 10.

A suction device 16 is displaceably supported for displacement in a displacement direction S relative to the drilling tool 2 on a rigid suction pipe 18 that extends through a guide opening 14 of the connection device 10. The displacement direction S is substantially parallel to a drilling direction B of the drilling tool 2. The suction pipe 18 performs a double function. On the one hand, it serves as a stable guide for the suction device 16 and, on the other hand, it serves as a suction conduit for connecting the suction head 20 with an aeration device 22. The guide opening 14 functions as a common guide for both the suction head 20 and the aeration device 22 or for the entire suction device 16.

The suction head 20 is provided on an end of the suction pipe 18 facing in the drilling direction B and has a suction nozzle 24 through which the drill 6 extends, as shown with dash lines.

The aeration device 22, which is provided at the opposite end of the suction pipe 18 has, as shown with dash lines, a ventilator 28 which is driven by a motor 26. The power supply of the motor 26 is effected from the power supply of the drilling tool 2 via a connection cable 30.

Figure 2:
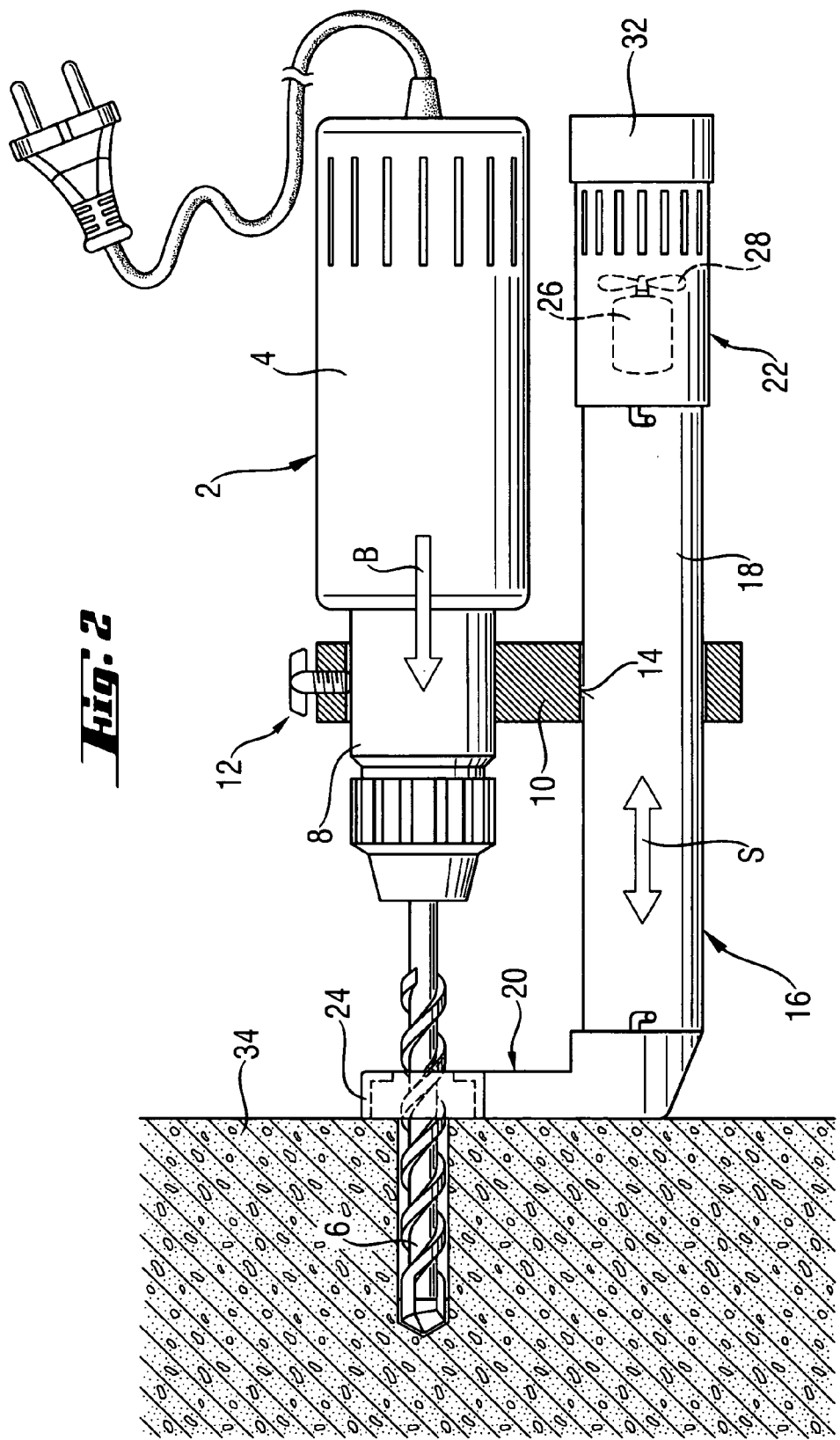
FIG. 2. a view similar to that of FIG. 1, but during a drilling process.

As shown in FIGS. 2-3, instead of the power supply from the power supply of the drilling tool 2, the aeration device 22 can be provided with an accumulator package 32 for supplying power to the motor 26. FIG. 2, as discussed above, shows the drilling tool 2 during the drilling process. The drill 6 penetrated into a wall 34. As a result of counter-pressure of the wall 34 on the suction head 20, the suction device 16, which includes the suction head 20, the suction pipe 18, and the aeration device 22 together with the accumulator package 32, has been displaced rearwardly relative the drilling tool 2 in the direction opposite the drilling direction B. Because of a rigid connection of the suction head 20 with the aeration device 22 by the rigid suction pipe 18, the distance between the suction head 20 and the aeration device 22 remains constant despite the displacement of the suction device 16. As a result, the flow characteristics remain substantially constant.

As shown in FIG. 3, the suction pipe 18 has a receiving chamber 36 over substantially its entire length and in which a filter element 38 can be inserted. At its outer side, the filter element 38 has a filter region 40 and inside, the filter element 38 has a flow channel 42 opening toward the aeration device 22.

As further shown in FIG. 3, the suction pipe 18 is positively connected with both the suction head 20 and the aeration device 22 by rapid-connection means in form of respective bayonet catches 44. This permits to use the suction device 16 with suction pipes 18 having different lengths which, in turn, permits to use the suction device 16 with drilling tools having different lengths.

For using a suction device 16, firstly, it is provided with a suction pipe 18, the length of which permits to place the suction nozzle 24 of the suction head 20 on the free end of the drill 6 of the drilling tool 2 with which the suction device 16 is to be used. Before the suction device 16 is secured to the tool, a filter element 38 is placed or is already located in the receiving chamber 36 of the suction pipe 18. Finally, the suction device 16 is secured on the receiving region 8 of the drilling tool 2 with the connection device 10 that includes the clamp means 12. Then, the drilling tool 2 is placed on the wall 34 at a predetermined location. As soon as the drill 6 starts to penetrate into the wall 34, the wall 34 applies pressure to the end surface of the suction head 20, displacing the suction head 20 in the direction opposite the drilling direction B rearwardly relative to the drilling tool 2. Because of the rigid connection of the aeration device 22 with the suction head 20 by the suction pipe 18, the aeration device 22 is also displaced in the same direction and by the same amount as the suction head 20. The displacement direction S of the suction device 16 remains parallel to the drilling direction B, with the suction pipe 16 functioning as guide means upon its displacement in the guide opening 14.

During the drilling process, the ventilator 28, which is driven by the motor 26, generates a suction air current, the flow path 46 of which is indicated in FIG. 3 with arrows. The suction air current provides for aspiration of the material, which is removed during the drilling process through the suction nozzle 24 and into the suction device 16. The material is aspirated through the filter region 40 into the flow channel 42, with the material, such as dust and drillings, being retained on the outer side of the filter region 40 in the receiving chamber 36. The filtered air flows through the opening 48 into the aeration device 22 over the motor 26 and is removed outwardly out of the suction device 16 by the ventilator 28.

In order to clean the receiving chamber 36 or replace the filter element 38, the bayonet catch 44 between the suction head 20 and suction pipe 18 is released by a short pivotal and axial movement of the suction head 20 relative to the suction pipe 18. Then, the filtered-out drillings can be removed from the receiving chamber 36.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A suction device (16) for use with a power drilling tool (2) for aspirating material removable during operation of the drilling tool, the suction device (16) comprising a suction head (20) displaceable relative to the drilling tool (2) in a direction opposite a drilling direction (B) of the drilling tool (2); an aeration device (22) including a ventilator (28) and a motor for driving the ventilator; a suction conduit for connecting the suction head (20) with the aeration device (22), the aeration device (22) being fixedly connected with the suction head (20) for joint displacement therewith relative to the drilling tool, wherein the suction conduit is formed by a rigid suction pipe (18), whereby the aeration device (22), together with the ventilator, is retained in a same position relative to the suction head (20) during displacement of the suction head (20) relative to the drilling tool (2); and guide means mountable on the drilling tool for supporting the suction device (16) for displacement relative to the drilling tool (2).

2. A suction device according to claim 1, further comprising means for releaseably mounting the guide means on the drilling tool (2).

3. A suction device according to claim 1, further comprising means for connecting the motor of the aeration device (22) with a power supply of the drilling tool (2).

4. A suction device according to claim 1, wherein the motor (26) of the aeration device (22) is formed as an accumulator-driven motor (26).

5. A suction device according to claim 1, wherein the rigid suction pipe (18) has a chamber (36) for receiving a filter element (38).

6. A suction device according to claim 5, wherein the receiving chamber (36) extends over a major portion of a longitudinal extent of the suction pipe (18).

\* \* \* \* \*